(12) United States Patent
Salgado

(10) Patent No.: US 6,643,035 B1
(45) Date of Patent: Nov. 4, 2003

(54) METHOD AND APPARATUS FOR MEASURING SCANNER REGISTRATION

(75) Inventor: David L. Salgado, Victor, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/448,805

(22) Filed: Nov. 24, 1999

(51) Int. Cl.$^7$ .............................. H04N 1/04; H04N 1/00
(52) U.S. Cl. .................... 358/474; 358/406; 358/444; 358/471; 358/488; 358/496; 358/497; 358/498; 399/15
(58) Field of Search ................................. 358/406, 504, 358/471, 474, 486, 488, 496, 497, 498, 505, 487, 506, 450, 296, 444, 404, 401; 399/15

(56) References Cited

U.S. PATENT DOCUMENTS

| | | | |
|---|---|---|---|
| 5,271,096 A | | 12/1993 | Cook ........................... 358/109 |
| 5,510,896 A | * | 4/1996 | Wafler ......................... 358/296 |
| 5,642,202 A | * | 6/1997 | Williams et al. ............. 358/406 |
| 5,813,771 A | * | 9/1998 | Ur et al. ....................... 400/74 |
| 6,016,207 A | * | 1/2000 | Wield ............................ 358/406 |
| 6,175,428 B1 | * | 1/2001 | On et al. ...................... 358/406 |
| 6,226,419 B1 | * | 5/2001 | Lodwick et al. ............. 382/294 |
| 6,243,173 B1 | * | 6/2001 | Lee et al. ..................... 358/488 |

FOREIGN PATENT DOCUMENTS

| | | |
|---|---|---|
| EP | 0 325 415 A2 | 7/1989 |
| EP | 0 325 415 A3 | 7/1989 |
| EP | 0 501 334 A3 | 9/1992 |
| EP | 0 501 334 A2 | 9/1992 |
| EP | 0 735 738 A3 | 10/1996 |
| EP | 0 735 738 A2 | 10/1996 |

OTHER PUBLICATIONS

"Method for Automatically Comparing a Printable Output to a Digitized Input", *IBM Technical Disclosure Bulletin*, vol. 34, No. 5, Oct. 1991.

"Diagnostics Algorithm for Image Scanner", *IBM Technical Disclosure Bulletin*, vol. 24, No. 4, Sep. 1981.

* cited by examiner

*Primary Examiner*—Cheukfan Lee
(74) *Attorney, Agent, or Firm*—Perman & Green, LLP

(57) ABSTRACT

A registration detection system for determining a registration problem in an apparatus having an optical reader adapted to scan a document. The system comprising a test pattern generator and a mixer for combining an output of the test pattern generator with an output of the optical reader.

24 Claims, 5 Drawing Sheets

METHOD AND APPARATUS FOR MEASURING SCANNER REGISTRATION

BACKGROUND OF THE INVENTION

1. Field of the Invention

The present invention relates to document processing machines and, more particularly, to document scanning requiring document registration.

2. Prior Art

Referring to FIG. 1, there is shown a perspective view of a document processing apparatus 10. The apparatus 10 could be any suitable type of document processing apparatus, such as a copier, a facsimile machine, a scanner, a computer printer, or a multifunction device having two or more functions. Referring also to FIG. 2, in this embodiment the apparatus 10 is a copier which includes an original document feed system 11 and a copy document feed system 13. A scanner or image obtainer 12 is provided under a transparent glass platen 15. The scanned information from an original document fed through the original document feed system 13 is imaged onto paper selected from paper trays 14 or 16. Paper selected from either of the paper trays 14,16 is moved by the copy document feed system 13 through the apparatus 10 by means of various belts 18 and rollers 19 schematically depicted in FIG. 2. The original document feed system 11 also comprises suitable belts and rollers for automatically moving original documents through the document system.

Various document systems require that an automatic document handling apparatus within the system operate so as to align a particular edge of a document with a given coordinate. For example, in an x-y coordinate system this could be the coordinates 0,0, on a copier platen where the scanner or copier optics have also been aligned to begin imaging at the 0,0 coordinates on the copier platen. This process of aligning the document relative to a given coordinate is known as document registration. In a manual copying operation, an original document is registered by the user with ruler markings along the sides of the platen. In systems having automatic document handling systems document registration is automatic and is generally accomplished by the use of various belts, rollers and sensors situated along the document path. If the original document is not properly registered then undesirable dark borders and shadow images may appear on the copy. Thus, while proper document registration is critical to the operation of a document processing system it is yet one of the most difficult to achieve features of an automatic document handling system. An automatic document handling system must rapidly and accurately register each original document. In general, the document registration accuracy desired is on the order of one millimeter. In addition, improper registration due to document skewing by the paper rollers can damage original documents and affect the further automatic operation of the document handler.

Various methods exist for measuring and aligning the registration of documents within a document handling system. For example, U.S. Pat No. 4,831,420 to Walsh et al. discloses a system for setting registration using pre-printed and specially constructed test. The test documents are comprised of identifying registration marks identifying registration position and a registration cutout window. Setting the registration involves registering and copying a preprinted test sheet using the document feeder in its initial and unadjusted, registration setting. The copy produced is then compared with the original test document by placing the copy of the test document under the original test document so that the test patterns on the copy are visible through the cutout window. Thus, the test patterns on the copy may be compared with the test patterns on the original revealing the amount of registration adjustment required.

Other methods that exist for setting document registration also involve the use of expensive, specially constructed, preprinted master test documents for a variety of paper sizes and test patterns. Other disadvantages to the preprinted master test document approach are lead times for printing the various test documents required and storage by the user, whether on site or by the field service engineer.

SUMMARY OF THE INVENTION

A registration detection system for measuring document registration in an apparatus having an optical reader adapted to scan a document. The system comprising a test pattern generator and a mixer for combining an output of the test pattern generator with an output of the optical reader.

A method for determining if a scanner registration problem exists in an apparatus adapted to scan a document, the method comprising the steps of: scanning a first image; combining a first test pattern with the scanned first image; and providing informative feedback resulting from the step of combining the first test pattern with the scanned first image.

A scanner device registration measuring system for determining a scanner registration problem in a scanner device. The system comprising a test pattern generator, an input document scanning device, and an image transfer system.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
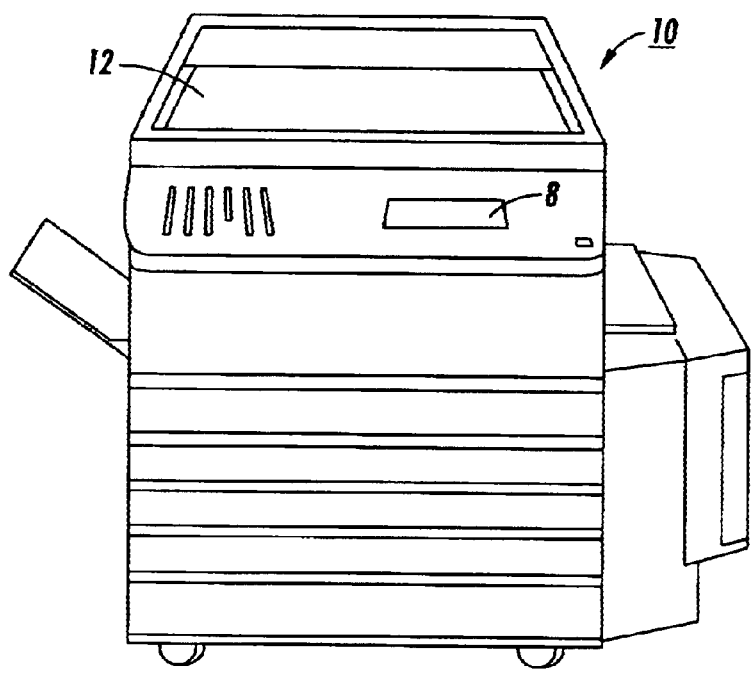
FIG. 1 is a perspective view of a conventional document processing apparatus.
Figure 2:
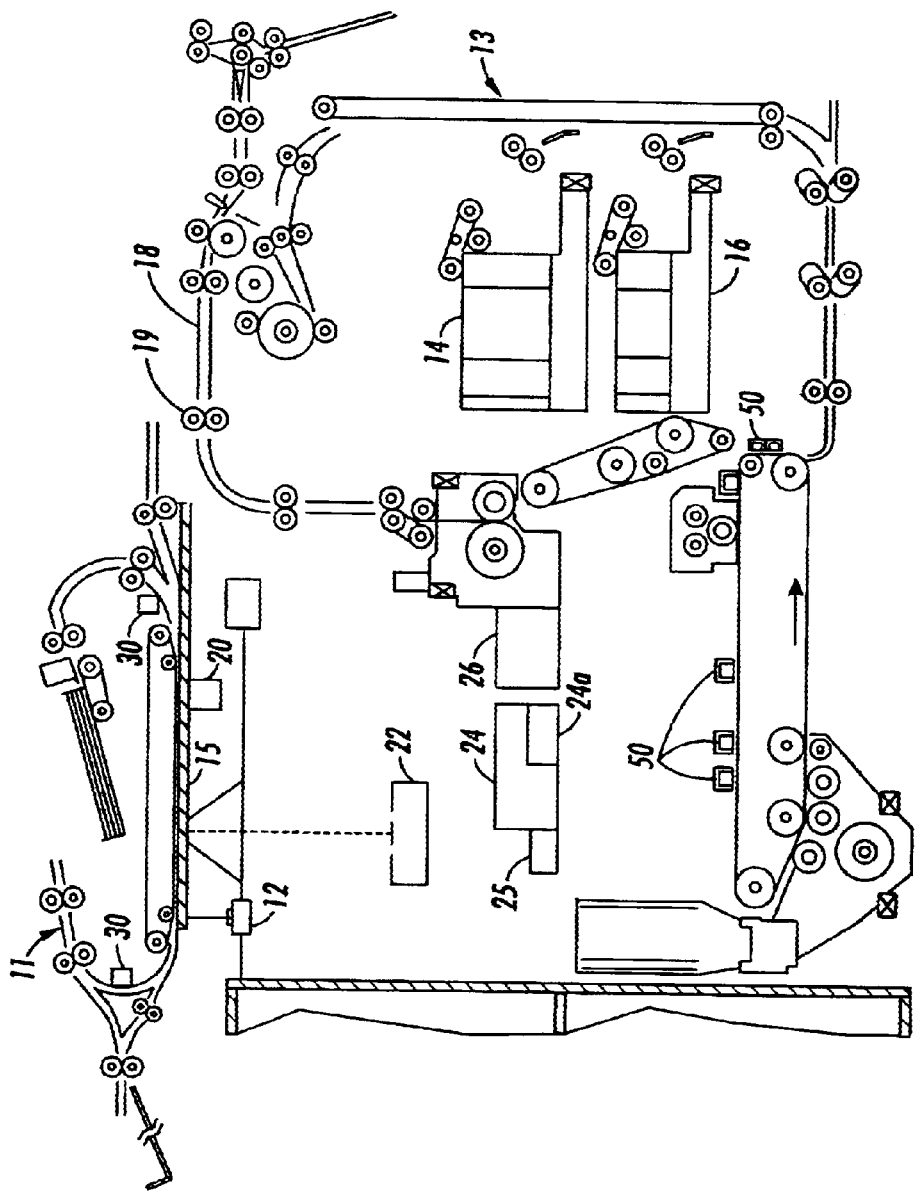
FIG. 2 is a schematic view of paper paths within the paper processing apparatus shown in FIG. 1.
Figure 3:
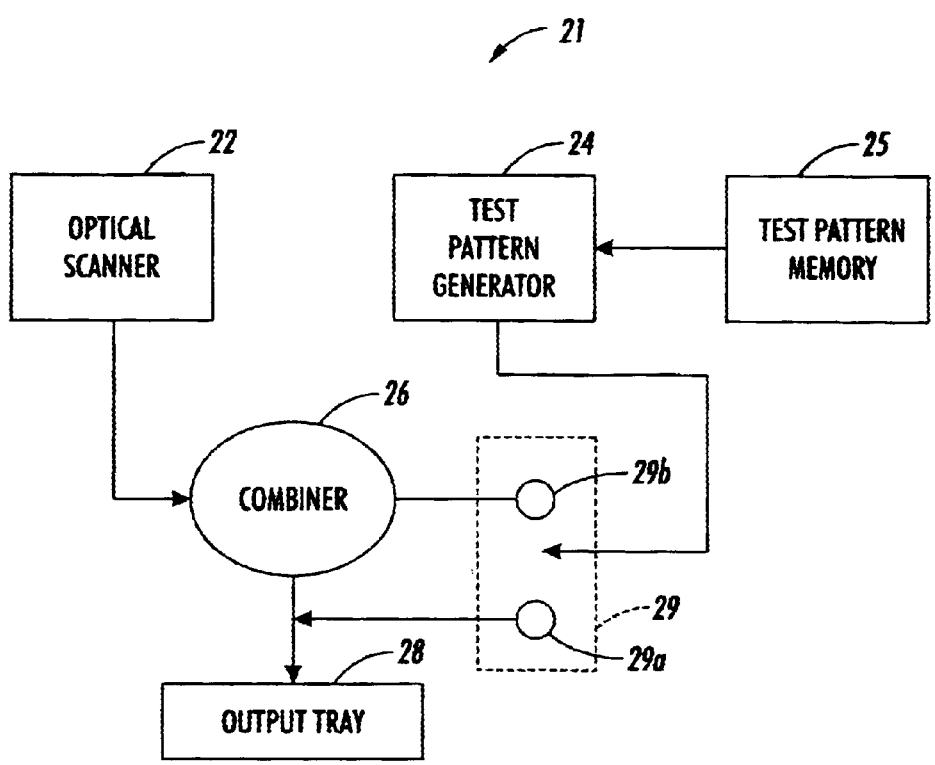
FIG. 3 is a block diagram of a document registration system incorporating features of the present invention.

Although the present invention will be described with reference to the single embodiment shown in the drawings, it should be understood that the present invention can be embodied in many alternate forms of embodiments. Referring now to FIG. 3 there is shown a block diagram of one embodiment of a document registration measuring system 21 incorporating features of the present invention. The system 21 is generally intended to be used for registering documents in a document processing apparatus such as described above with reference to FIGS. 1 and 2 (e.g.: a copier, a facsimile machine, a computer printer, a scanner, or a multifunction device). The system 21 generally comprises an optical scanner 22, a test pattern generator 24, test pattern memory 25, a combiner 26, and a selector 29 for selecting the output of the test pattern generator 24 or combining the output with information provided by the optical scanner 22.

The optical scanner 22 generally comprises any suitable system for detecting light and translating it into electric signals in order to reproduce or sense and subsequently transmit an image. This is usually accomplished by the use of various photoelectric devices, such as a photoelectric cell. Optical sensing typically involves moving a finely focused beam of light across a document and recording variations in intensity or another property of light as the light is transmitted or reflected from an original document. Alternatively, any suitable photocopying, processes that use chemical, electrical, or photographic techniques to copy printed or pictorial matter may be used.

The test pattern generator 24 generally comprises an integrated circuit board 24a generally capable of image processing functionality such as magnification, screening, contrast control, and test pattern generation. Generally, the test pattern generator is controlled by user input from the user interface 8 (see FIG. 1), but could also be controlled by onboard switches or an external interface such as a portable service workstation.

The test pattern memory 25 generally comprises a data storage medium capable of storing various test patterns. The medium may be any suitable data medium such as Read-Only-Memory chips located on board the test pattern generator 24, or within a software program.

The selector 29 for selecting the test pattern generator is represented symbolically as a switch. However, any suitable means for selecting between the output of the test pattern generator 24 or combing the output with the output of the optical scanner 22 in the combiner 26 may be used.

Figure 5:
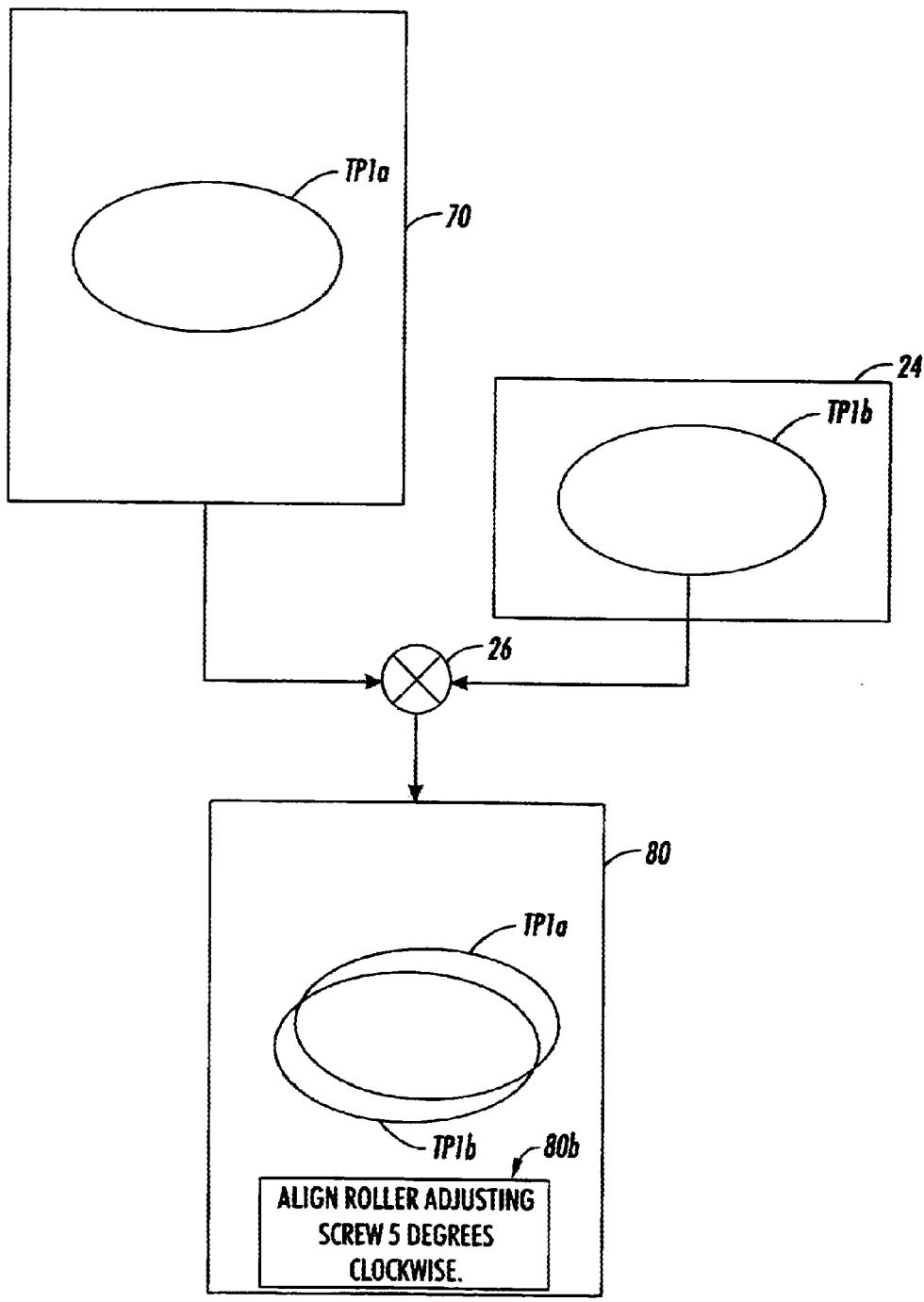
FIG. 5 is a schematic representation of combining a printed test pattern with the same test pattern residing in memory.

In general, the combiner 26 comprises a combiner capable of mixing the input from the optical scanner 22 with the input from the test pattern generator 24 so as to overlay the test pattern on the copy. This is represented graphically in FIG. 5. Test pattern TP1a is printed on hardcopy 70. Hardcopy 70 is scanned and combined with test pattern TP1b from test pattern generator 24 in combiner 26. The output from the combiner 26 is hardcopy 80 which shows TP1b overlying TP1a. The difference between the patterns represents the registration error. In addition, the combiner 26 may digitally mix the input signals to provide registration information and instruction to correct registration error such as shown in 80b. The combiner may be any suitable combiner that is compatible with the document processing apparatus and the test pattern generator and could include a digital mixing circuit. The combiner 26 may use any suitable method for combing the output of the test pattern generator 24 with the output of the optical scanner 22.

Figure 4:
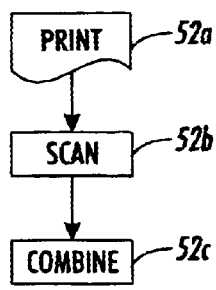
FIG. 4 is a flowchart of one method for measuring document registration using the system shown in FIG. 3.
Figure 4A:
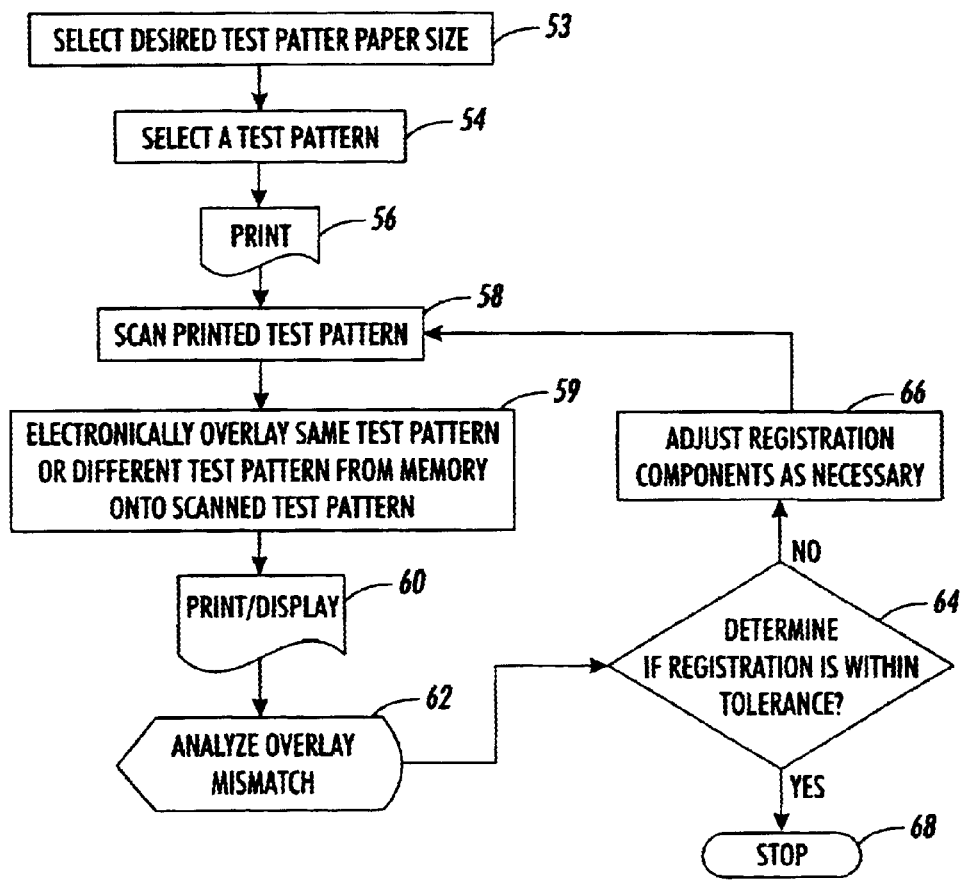
FIG. 4a is an exploded flowchart of the one method for measuring document registration shown in FIG. 4.

Referring also to FIG. 4 there is shown a flowchart of one method for measuring document registration using the system shown in FIG. 3. In short, the user merely prints 52a, scans 52b, an combines 52c, to determine document registration. These steps are further illustrated in FIG. 4a. The user can start by selecting various parameters unique to the system under test via the user interface 8 (see FIG. 1) or an external interface such as portable work station. These parameters may include fast or slow scan size scales and copy document size 53. Next the operator can select the desired test pattern 54. The test pattern may be crosshair, edged, edged crosshair, grid, edged grid, or any suitable type of test pattern appropriate to the system under test. The operator can then direct the system to print 56 a copy of the test pattern directly to the output (i.e., switch 29 in FIG. 3 is in the 29a position). A test pattern so produced is now designated as the master test pattern document. The master test pattern document is loaded into the document handling system 11 of copier 10 or manually placed on the platen 12 (see FIG. 1). The master test pattern document is then cycled through the copier by normal operation. The optical scanner 22 scans the master test pattern document and provides the scanned test pattern as one input to the combiner 26. Meanwhile switch 29 has been automatically or manually moved to the 29b or electronic overlay position 59 so that the test pattern that was previously printed is now provided as a second input to combiner 26. Combiner 26 electronically overlays 59 the test pattern from the test pattern generator 26 over the scanned test pattern from the optical scanner 22. The combination is printed onto a single output document 60 for visual analysis 62 by the user. Ideally, the overlayed test pattern should be identical with the scanned test pattern resulting in what would appear to the operator as a single test pattern print out. However, in practice some tolerance is allowed, thus if the registration is within the allowable tolerance the registration of the automatic handling device is acceptable. If otherwise, the user can adjust the components affecting registration 66 as necessary and repeats the steps described above. Optionally, it may be desirable to mix the digital signals in the combiner 26 so as to produce a difference signal indicating numerically the magnitude and direction of a registration problem of the document handling system 11. Another test pattern option for determining document registration may be the selection of complimentary or cooperating test patterns. Cooperating test patterns would be designed to measure the registration of the entire document. For example the test pattern overlaid on the copied test pattern need not be identical as described above but could be the second half of a stored image such that when overlaid with the image of the first half the output is the complete image. If the two images do not form the whole image or if the image seam(s) are distorted the user may immediately detect a registration problem and proceed to correct as described above.

Thus, as described above, an advantage of this invention over other methods is that the user has immediately available a variety of master test designed to measure document registration. Other methods for measuring document registration require expensive and specially constructed preprinted master test documents. With one embodiment of this invention the user may print specific test patterns on specific paper sizes as needed to visually or electronically measure document registration as described above.

Another advantage of this invention over other methods concerns the logistics of providing master test documents for measuring document registration. The present invention allows the user to print a specific test pattern on a specific size document as needed. Prior art methods using preprinted master test documents require ordering and storing the test documents well in advance of actual required use due to long lead times generally associated with specially constructed test documents. Thus, the present invention allows the user to measure and determine the extent of a registration problem without external special supplies such as preprinted test documents.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A registration detection system for measuring document registration in an apparatus having an optical reader adapted to scan a document, the system comprising:
   a test pattern generator; and
   a mixer for automatically combining an output of the test pattern generator with an output of the optical reader and generating a difference signal representing a registration error.

2. A scanner registration detection system as in claim 1 wherein the test pattern generator comprises:
   a memory device; and
   an integrated circuit board connected to the memory device.

3. A scanner registration detection system as in claim 2 wherein the memory device comprises a computer readable data storage medium having at least one test pattern program.

4. A scanner registration detection system as in claim 3 wherein the computer readable data storage medium having at least one test pattern program further comprises crosshair, edged, edged crosshair, grid, and edged grid test pattern programs.

5. A scanner registration detection system as in claim 1 wherein the mixer for combining an output of the test pattern generator with an output of the optical reader comprises a digital mixing circuit.

6. The registration detection system of claim 1, wherein the output of the test pattern generator is an electronic output and the output of the optical reader is an electronic output, and wherein the mixer electronically overlays the electronic test pattern output over the electronic optical reader output to form a combined overlay.

7. The registration detection system of claim 6, wherein the combined overlay is electronically analyzed in a digital form to determine registration errors.

8. The registration detection system of claim 6, wherein the combined overlay is printed for visual analysis.

9. The registration detection system of claim 1 wherein the test pattern generator is adapted to generate a test pattern for any paper size.

10. The registration detection system of claim 1 wherein the test pattern generator is adapted to generate a first test pattern that is complementary to the output of the optical reader and a seam formed between the first test pattern and the output of the optical reader determines the registration error.

11. The registration detection system of claim 1 wherein the mixer is further adapted to electronically overlay the output of the test pattern generator over the output of the optical reader and a combined pattern is analyzed for the registration error.

12. A method for determining if a scanner registration problem exists in an apparatus adapted to scan a document, the method comprising the steps of:
   printing a first image
   scanning the first image;
   automatically combining a first test pattern with the scanned first image; and
   providing informative feedback resulting from the step of combining the first test pattern with the scanned first image in order to identify a registration error.

13. A method as in claim 12, wherein the step of printing the first image further comprises the steps of:
   retrieving the first test pattern from a memory device;
   selecting at least one first medium; and
   imaging the first test pattern on the at least one first medium.

14. A method as in claim 12, wherein the step of combining the first test pattern with the first scanned image further comprises the steps of:
   retrieving a digital copy of the first test pattern from a memory device;
   displaying the digital copy of the first test pattern onto a second medium; and
   displaying the first image scanned onto the second medium.

15. A method as in claim 12, wherein the step of providing informative feedback resulting from the step of combining the first test pattern with the scanned first image further comprises the steps of:
   measuring a difference between the scanned first image and the first test pattern; and
   correlating the difference to indicate the degree of scanner registration alignment.

16. The method of claim 12 wherein the step of automatically combining comprises electronically overlaying the scanned first image over the first test pattern to produce a single combined image.

17. The method of claim 16 further comprising generating a difference signal from the single combined image that indicates the registration problem.

18. The method of claim 17 wherein the difference signal indicates a magnitude and a direction of the registration problem.

19. The method of claim 12 wherein the first test pattern is complementary to the scanned first image and a seam formed between the combined first test pattern and scanned first image determines the registration error.

20. The method of claim 12 wherein the first test pattern and the scanned first image are electronically combined so that the first test pattern is electronically overlaid on the scanned first image and the registration error is generated as a difference signal representing a magnitude and direction of the registration error.

21. A scanner device registration measuring system for determining a scanner registration problem in a scanner device, the system comprising:
   a test pattern generator;
   an input document scanning device; and
   an image transfer system connected to the test pattern generator and the input document scanning device the image transfer system adapted to automatically merge a calibration pattern scanned by the scanning device with a generated pattern from the test pattern generator, the merge adapted to identify any registration problems.

22. A scanner device registration measuring system as in claim 21 wherein the test pattern generator comprises:
   a data storage device having at least one data test pattern; and
   an integrated circuit board connected to the data storage device.

23. The scanner device registration measuring system of claim 21, wherein the image transfer system automatically generates a printed image of the merged calibration pattern and the generated pattern allowing a visual indication of the scanner registration problem.

24. The scanner device registration measuring system of claim 23, wherein the difference signal numerically indicates a magnitude and direction of the scanner registration problem.

* * * * *